United States Patent
Alznauer et al.

(10) Patent No.: US 6,883,383 B2
(45) Date of Patent: Apr. 26, 2005

(54) PRESSURE MEASURING DEVICE

(75) Inventors: Miroslaw Alznauer, Wies (DE); Thomas Uehlin, Schopfheim (DE); Frank Gutmann, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/450,538

(22) PCT Filed: Dec. 14, 2001

(86) PCT No.: PCT/EP01/14791
§ 371 (c)(1),
(2), (4) Date: Oct. 27, 2003

(87) PCT Pub. No.: WO02/052239
PCT Pub. Date: Jul. 4, 2002

(65) Prior Publication Data
US 2004/0050169 A1 Mar. 18, 2004

(30) Foreign Application Priority Data
Dec. 22, 2000 (DE) ......................... 100 64 811

(51) Int. Cl.⁷ ................................ G01L 7/00
(52) U.S. Cl. ..................................... 73/756
(58) Field of Search ................ 73/700, 714, 706, 73/756

(56) References Cited

U.S. PATENT DOCUMENTS

4,539,849 A  9/1985  Pike
5,852,244 A  12/1998  Englund

FOREIGN PATENT DOCUMENTS

DE  42 13 857 A1  10/1993
DE  42 34 290 A1  4/1994
EP  0 757 237 A2  2/1997

Primary Examiner—William Oen
(74) Attorney, Agent, or Firm—Bacon & Thomas

(57) ABSTRACT

A pressure measurement device, a receiving tube, in which a pressure sensor element is axially clamped by means of a screw element. Between the screw element and the pressure sensor element, a transmission element is arranged to transmit axial clamping forces. The pressure measurement device exhibits at least one first stop, which is not rotatable relative to the receiving tube, wherein the transmission element exhibits at least one second stop, which is engaged with the at least one first stop, in order to prevent a rotation of the transmission element. In this way, a transmission of torque to the pressure sensor element during assembly is prevented. Preferably the first stop is arranged on a bushing which centers the pressure sensor element in the receiving tube.

8 Claims, 2 Drawing Sheets

PRESSURE MEASURING DEVICE

This application is a 371 of PCT/EP01/14791, filed Dec. 14, 2001.

FIELD OF THE INVENTION

The invention relates to a pressure measurement device. In particular, the invention concerns a pressure measurement device with a pressure sensor element, which exhibits a membrane-type deformation body on a frontal side. The pressure sensor element is arranged in a receiving tube, wherein the membrane-type deformation body faces a sensor opening, where in operation of the pressure measuring device a measurement medium is located. The sensor opening is bounded by a shoulder, which extends radially inwards from the wall of the receiving tube an defines an axial abutment surface for the sensor element. On the side of the pressure sensor element away from the measurement medium, preferably in the receiving tube, an electronic circuit is provided for processing the primary sensor signals. Between the frontal side of the pressure sensor element and the axial abutment surface of the receiving tube, a sealing element is usually provided, to prevent intrusion of the measurement medium into the interior of the receiving tube.

BACKGROUND OF THE INVENTION

For pressure measuring devices of this type, it has proved to be difficult to obtain reliable sealing between the pressure sensor element and the receiving tube, without affecting the measurement accuracy of the sensor due to mechanical stresses.

The invention consequently has as an object providing a pressure measurement device which overcomes the described problem.

SUMMARY OF THE INVENTION

The invention discloses a pressure measurement device, including:

a pressure sensor element with a membrane-type deformation body arranged in a frontal surface of the pressure sensor element;

an essentially cylindrical receiving tube with a first thread, and a shoulder for bearing axial forces, which shoulder extends radially inwards from the cylindrical wall of the receiving tube and defines a sensor opening; and a screw element with a second thread complementary to the first thread and having at least one clamping surface on a frontal side for receiving axial forces, wherein the screw element can be screwed into the receiving tube, for axially clamping the pressure sensor element between the clamping surface and the shoulder, wherein the pressure sensor device further exhibits:

at least one first stop, which cannot rotate with respect to the receiving tube, and a transmission element clamped between the screw element and the pressure sensor element for transmitting the axial clamping force, wherein the transmission element exhibits at least one second stop, which is in engagement with the at least one first stop, for preventing a rotation of the transmission element in the receiving tube.

The described structure guards against transmission of torque to the pressure sensor element during assembly of the pressure measurement device which could otherwise lead to torsion stresses in the pressure sensor element and adversely affect the measurement accuracy.

According to a further aspect of the invention, a cylindrical bushing can be arranged in the receiving tube to position, respectively center, the pressure sensor element spaced from the cylindrical wall of the receiving tube. With suitable choice of material, the pressure sensor element is electrically and/or thermally insulated from the receiving tube and protected against radial mechanical loads, for example jolts or shocks. The bushing is preferably formed of a thermoplastic or thermoelastic polymer.

The bushing is preferably held by a force fit in the receiving tube, but, optionally, shape-keying connections between the bushing and the receiving tube can be provided. However, with appropriate dimensioning, the force fit should already be sufficient to prevent a rotation of the bushing in the receiving tube.

Preferably, the at least one first stop is provided as a part of the bushing or on the bushing. It can, for instance, be embodied as a tongue that extends from the bushing in the axial or radial direction. Furthermore, the at least one first stop can be formed as a recess in an inner lateral surface or an end surface of the bushing. The first stop serves as a rotation stop for the complementarily shaped at least one second stop of the transmission element.

The stops must be so formed that they limit a rotation of the transmission element but do not affect its axial movement, at least to the extent that the transmission element can contact the pressure sensor element without restraint and can press such against the shoulder of the receiving tube.

Although the invention can fundamentally be realized with one first stop and one complementary second stop, reasons of more uniform force distribution make it preferred to provide a number of matching pairs of complementary first and second stops, which preferably are arranged symmetrically according to their number. Two pairs are thus, for example, displaced 180-degrees from one another around the axis of symmetry of the receiving tube, while three or four pairs exhibit displacement angles of 120-degrees and 90-degrees, respectively.

Regardless of the above considerations that favor a symmetric arrangement, a departure from the symmetry can be preferred, in order, for reasons not discussed in more detail here, to achieve a unique orientation of the transmission element with respect to the receiving tube or the bushing. A departure from symmetry can, for example, be achieved by changing the angle between the stop pairs or by varying the contours, for instance the width, of a stop pair.

In general, the structure of the invention is applicable for any pressure sensor elements that are held exposed to a measurement medium on their frontal side. However, the invention is especially intended for capacitive measurement cells with a ceramic membrane, piezoresistive cells with a silicon membrane, or inductive measurement cells.

Although the frontal side of the pressure sensor element can be clamped right against the shoulder of the receiving tube, it is currently preferred to place a sealing element, for example an O-ring, between the frontal side of the pressure sensor element and the shoulder.

The invention is explained in greater detail on the basis of the following drawings, which show as follows:

DESCRIPTION OF THE PREFERRED EMBODIMENTS

Figure 1:
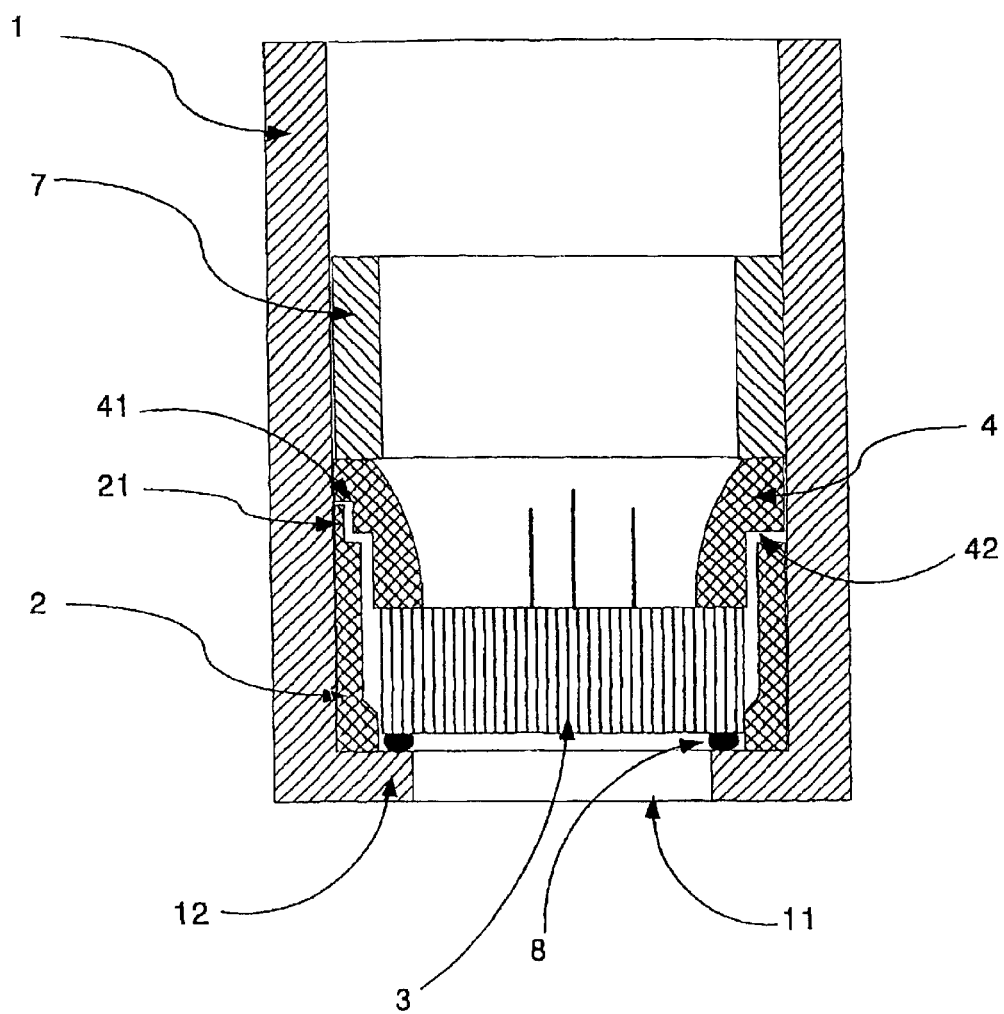
FIG. 1: is a longitudinal cross section through a pressure measurement device of the invention.
Figure 2:
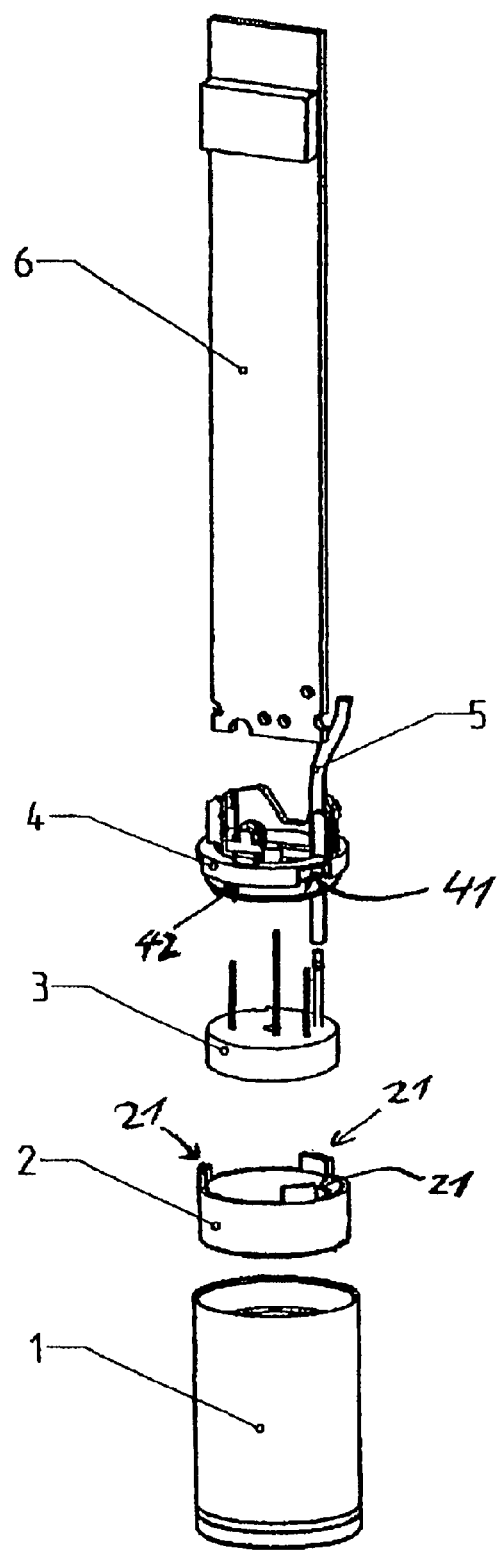
FIG. 2: is an exploded view of the components of pressure measurement device of the invention.

FIGS. 1 and 2 provide a view of the components of one embodiment of the pressure measurement device of the invention and their arrangement with respect to one another.

A receiving tube 1 has a rear opening, through which a bushing 2 can be inserted into the receiving tube 1. In this example of the invention, bushing 2 is fixed in the receiving tube 1 by a force fit. As can be perceived from FIG. 1, the bushing is located in the front end section of the receiving tube 1 and abuts with its first, frontal side against an axial abutment surface formed by a shoulder 12. Shoulder 12 extends radially inwards from the tube wall of the receiving tube 1 and defines a sensor opening 11.

An essentially cylindrical pressure sensor element 3 is centered with reference to the sensor opening 11 by means of the bushing 2.

A sealing element 8 is clamped between pressure sensor element 3 and the axial abutment surface of the shoulder 12. Sealing element 8 is preferably in the form of an O-ring of an elastic material. Bushing 2 in the illustrated embodiment exhibits a radial abutment surface which protrudes radially inwards from the inner wall of the bushing. With this arrangement, contact between the lateral surface of the pressure sensor element 3 and the bushing is reduced, so that the electrical and/or thermal isolation of pressure sensor element 3 is improved. Although this embodiment is advantageous, the invention can nevertheless also be realized without this feature.

For the axial fixing of the pressure sensor element 3 in the receiving tube 1, a transmission element 4 is used. Transmission element 4 exhibits on its frontal side toward the pressure sensor element 3 an axial abutment surface, which sits against the rear side of the pressure sensor element 3, away from the sensor opening 11. Preferably, the axial abutment surface is a continuous, circular ring surface. In an alternative embodiment, the axial abutment surface is divided into several separated surface segments, which contact the sensor element 3.

The transmission element 4 has on its rear side away from the pressure sensor element a second axial abutment surface, against which sits a screw element 7, which is screwed into the receiving tube 1 for axially clamping the pressure sensor element 3 by means of the transmission bushing 4.

The screw element 7 preferably has, at least in its end region toward the transmission element 4, the form of a cylindrical bushing, whose frontal side sits against the second axial abutment surface of the transmission element along a ring-shaped contact surface.

In so far as the axial clamping force acts as a normal force on the contact surface, friction arises between the screw element 7 and the transmission element 4 that causes torque when the screw element is screwed in. The torque increases with clamping force. In the absence of precautionary measures, this torque would cause the transmission element 4 to rotate and concomitantly introduce a torque into the pressure sensor element 3. This torque would be transmitted right through to the frontal side of the pressure sensor element 3 facing the sensor opening 11 and into the membrane-type deformation body. In order to prevent this, pairs of complementary first and second stops are provided, which block a rotation of the transmission element 4 in the receiving tube 1.

In the described embodiment the first stops are shaped as tongues 21 which extend from the end of bushing 2 in the axial direction.

The second stops are formed as a complementary recesses 41 in the lateral surface of a first cylindrical section of the transmission element 4. The first cylindrical section borders on a second cylindrical section with a smaller radius than the first cylindrical section, so that a shoulder surface 42 is formed between the two cylindrical sections. The recesses 41 in the lateral surface of the first section extend in the axial direction up to the shoulder surface 42 between the first and the second sections and are open toward the shoulder surface 42.

The tongues 21 extend through the shoulder surface 42 into engagement with the recesses 41, and thus block a rotation of the transmission element 4 with reference to bushing 2. In so far as the bushing 2 cannot rotate in the receiving tube, the transmission element 4 is also secured in the described arrangement against a rotation relative to the receiving tube. In this way, it is assured that no disturbing torques are introduced into the pressure sensor element during assembly of the pressure measuring device.

Besides the described arrangement of recesses and tongues, other embodiments of stops are also thinkable. For example, projections can extend from a surface of the transmission element that engage with complementary recesses in the bushing 2 or the wall of tube 1.

FIG. 2 shows as further details a circuit board 6, which is held in a seat on the transmission element 4. Also arranged on the transmission element in this embodiment is a line 5 for transmitting the reference pressure. These matters, however, merely concern advantageous or expedient developments of the invention, which are not essential for practicing the invention.

The pressure measuring device of the invention is especially suited as an immersion sensor for measuring a hydrostatic pressure, but it is in no case limited to this use.

The receiving tube 1 can, besides being in the tube form in the narrow sense shown in the drawings, be equally realized by an essentially cylindrical bore in a massive body, without departing from the basic ideas of the invention.

What is claimed is:

1. Pressure measurement device, including:
   a pressure sensor element with a membrane-type deformation body arranged in a frontal surface thereof;
   an essentially cylindrical receiving tube having a first thread on tube cylindrical tube wall, and a shoulder for bearing axial forces, which shoulder extends radially inwards from said cylindrical wall and defines a sensor opening; and
   a screw element having a second thread complementary to said first thread, and at least one clamping surface on a frontal side for bearing axial forces, wherein:
   said screw element can be screwed into said receiving tube, for axially clamping said pressure sensor element between said clamping surface and said shoulder; and
   said pressure measurement device further has: at least one first stop, which cannot be rotated with respect to said receiving tube, and a transmission element clamped between said screw element and said pressure sensor element, for transmitting the axial clamping force, said transmission element exhibits at least one second stop, which engages with said at least one first stop for preventing a rotation of said transmission element.

2. The pressure measuring device as claimed in claim 9, further including;
   a cylindrical bushing, arranged in said receiving tube, which position said pressure sensor element spaced from said cylindrical wall, wherein said bushing includes the at least one first stop.

3. The pressure measurement device as claimed in claim 2, wherein:
   said at least one first stop is in the form of a tongue that extends from an end of said busing in the axial direction.

4. The pressure measurement device as claimed in claim 2, wherein:
said at least one first stop is in the form of a projection that extend radially inwards from said bushing.

5. The pressure measurement device as claimed in claim 2, wherein:
said at least one first stop is in the form of a recess in said bushing.

6. The pressure measurement device as claimed in claim 2, wherein:
said bushing is fixed in said receiving tube by a force fit.

7. The pressure measurement device as claimed in claim 1, wherein:
said bushing exhibits a first engagement means and said receiving tube exhibits a complementary second engagement means, in order to provide a mated-shape guard against rotation of said bushing relative to said receiving tube.

8. The pressure measurement device as claimed in claim 7, further including:
a sealing ring, which is clamped between the frontal surface of said sensor element and the axial abutment surface of said radial shoulder.

* * * * *

UNITED STATES PATENT AND TRADEMARK OFFICE
CERTIFICATE OF CORRECTION

| | |
|---|---|
| PATENT NO. | : 6,883,383 B2 |
| APPLICATION NO. | : 10/450538 |
| DATED | : April 26, 2005 |
| INVENTOR(S) | : M. Alznauer et al. |

It is certified that error appears in the above-identified patent and that said Letters Patent is hereby corrected as shown below:

Column 4, line 60, the word "position" should be corrected to read as --positions--

Column 4, line 66, the word "busing" should be corrected to read as --bushing--

Column 5, line 4, the word "extend" should be corrected to read as --extends--

Signed and Sealed this

Twenty-second Day of May, 2007

JON W. DUDAS
*Director of the United States Patent and Trademark Office*